US007564459B2

(12) United States Patent
Loop et al.

(10) Patent No.: US 7,564,459 B2
(45) Date of Patent: Jul. 21, 2009

(54) RESOLUTION-INDEPENDENT CURVE RENDERING USING PROGRAMMABLE GRAPHICS HARDWARE

(75) Inventors: Charles T. Loop, Bellevue, WA (US); James Frederick Blinn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 145 days.

(21) Appl. No.: 11/264,749

(22) Filed: Oct. 31, 2005

(65) Prior Publication Data

US 2007/0097123 A1    May 3, 2007

(51) Int. Cl.
G06T 11/20    (2006.01)
(52) U.S. Cl. .................................................. 345/442
(58) Field of Classification Search .................. 345/441, 345/442
See application file for complete search history.

(56) References Cited

U.S. PATENT DOCUMENTS 4,855,934 A * 8/1989 Robinson .................... 345/582

OTHER PUBLICATIONS

Charles Loop, Jim Blinn; Resolution Independent Curve Rendering using Programmable Graphics Hardware; Jul. 2005, ACM Transactions on Graphics (TOG), Proceedings of ACM Siggraph 2005, vol. 24, Issue 3, pp. 1000-1009.*

Le-Jeng Shiue, Ian Jones, Jorg Peters; A Realtime GPU Subdivision Kernel; Jul. 2005, ACM Transactions on Graphics (TOG), Proceedings of ACM Siggraph 2005, vol. 24, Issue 3, pp. 1010-1015.*

Michael Guthe, Akos Balazs, Reinhard Klein; GPU-based trimming and tessalation of NURBs and T-Spline surfaces; Jul. 2005, ACM Transactions on Graphics (TOG), Proceedings of ACM Siggraph 2005, vol. 24, Issue 3, pp. 1016-1023.*

John Hable, Jarek Rossignac; Blister: GPU-based rendering of Boolean combinations of free-form triangulated shapes; Jul. 2005, ACM Transactions on Graphics (TOG), Proceedings of ACM Siggraph 2005, vol. 24, Issue 3, pp. 1024-1031.*

Sederberg, T., Implicit and Parametric Curves and Surfaces for Computer Aided Geometric Design, PhD thesis, Purdue University, 1983, Mechanical Engineering Department, pp. 53-59.*

Sederberg, T., Piecewise algebraic surface patches, Dec. 1984, Computer Aided Geometric Design 2 (1985) 53-59 North-Holland pp. 53-59.*

Harris, M., Luebke, D., Buck, I., Govindaraju, N., Krüger, J., Lefohn, A. E., Purcell, T. J., and Woolley, C., GPGPU: General-purpose computation on graphics hardware, 2004, Course Notes Article No. 33 of Siggraph 2004, pp. 1, 2, 123-138.*

Lindholm, E., Kligard, M. J., and Moreton, H., A user-programmable vertex engine, 2001, In Siggraph '01 Conference Proceedings, pp. 149-158.*

(Continued)

*Primary Examiner*—Jeffery A Brier
(74) *Attorney, Agent, or Firm*—Klarquist Sparkman, LLP

(57) ABSTRACT

A shape defined partially be a Bézier curve is rendered through a GPU-implemented technique which determines for various screen points which side of the curve the points lie on. This is done in the particular case of cubic Bézier curves for shapes defined by the Bézier control points of the curves. The type of the curve is identified through an analysis of an inflection point polynomial based on the curve. The curve is then projected to a canonical implicit form in a canonical texture space, allowing computation to be efficiently performed on a simple canonical form of the curve.

20 Claims, 12 Drawing Sheets

OTHER PUBLICATIONS

Arnon, D., Topologically reliable display of algebraic curves. *Siggraph 1983 Conference Proceeding 17*, 3 (Jul. 1983), pp. 219-227.

Blinn, J., *Jim Blinn's Corner Notation, notation, notation*. Morgan Kaufmann. 2003, Chapters 14, 15, 16, and 19.

Gumhold, S., Splatting illuminated ellipsoids with depth correction. In *Proceedings of 8th International Fall Workshop on Vision, Modelling and Visualization 2003*, 2003, pp. 245-252.

Gupta, S. et al., Filtering edges for gray-scale displays. *Siggraph 1981 Conference Proceeding 15*, 3, 1981, pp. 1-5.

Prasad, L., Morphological analysis of shapes. *CNLS Newsletter 139* (Jul. 1997), pp. 1-21.

Press, W. et al., *Numerical Recipes in C++*. Cambridge Press, 1992, pp. 183-186.

Ramanarayanan, G. et al., Feature-based textures. In *Eurographics Symposium on Rendering*, Eurographics Association, 2004, 10 pages.

Salmon, G., *A Treatise on the Higher Plane Curves*, Dublin, Hodges & Smith, 1852, 193 pages.

Sen, P., Silhouette maps for improved texture magnification. In *Proceedings of the ACM Siggraph/Eurographics Conference on Graphics Hardware*, Eurographics Association, 2004, 10 pages.

Stone, M., A geometric characterization of parametric cubic curves. *ACM Transactions on Graphics 8*, 4 (Jul. 1989), pp. 147-163.

Taubin, G., Distance approximations for rasterizing implicit curves. *ACM Transactions on Graphics 13*, 1 (Jan. 1994), pp. 3-42.

Tumblin, J. et al., Bixels: Picture samples with sharp embedded boundaries. In *Eurographics Symposium on Rendering*, Eurographics Association, 2004, 10 pages.

Tupper, J., Reliable two-dimensional graphing methods for mathematical formulae with two free variables. *Siggraph 2001 Conference Proceeding*, 2001, pp. 77-86.

Turkowski, K., Anti-aliasing through the use of coordinate transformations. *ACM Transactions on Graphics 1*, 3 (Jul. 1982), pp. 215-234.

\* cited by examiner

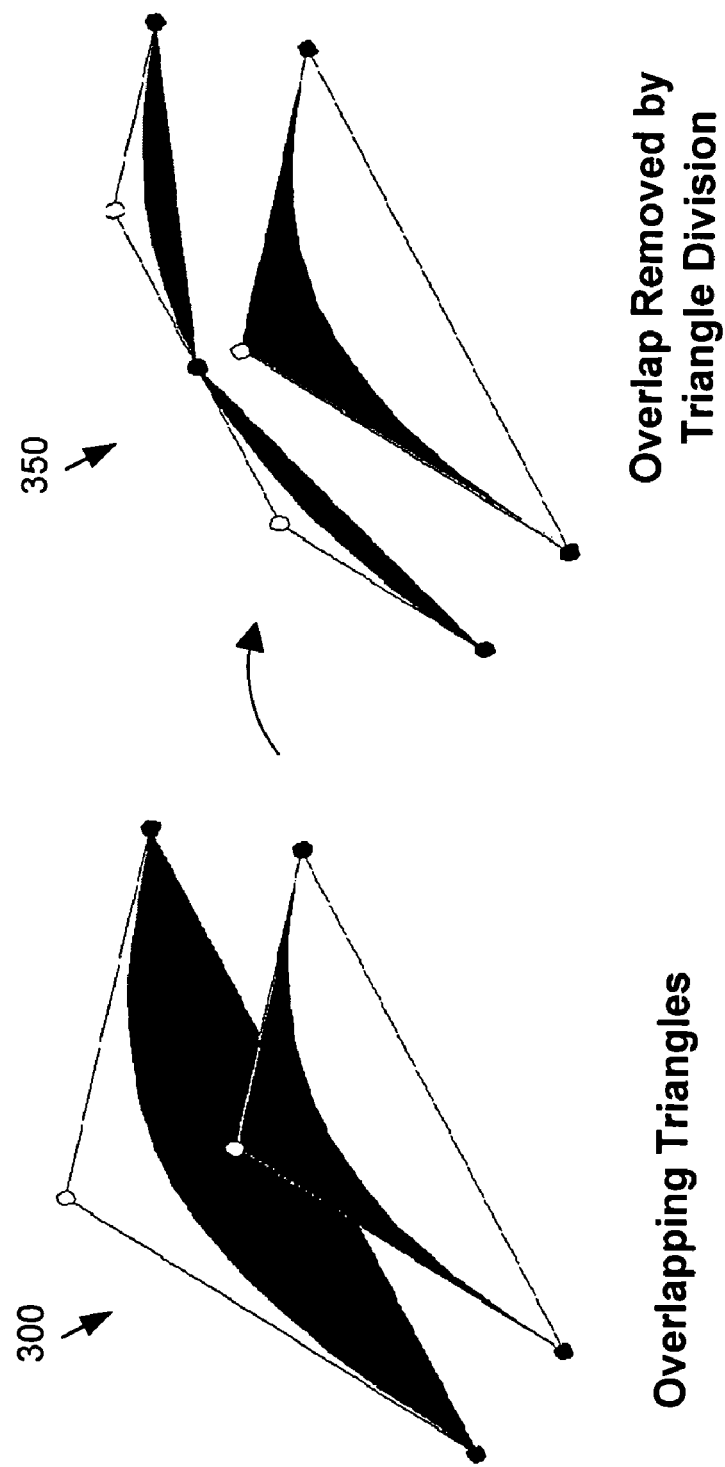

Cubic curve defining two areas

Cubic curve (with control points)

Fig. 9

900

```
           ┌─────────┐
           │  Start  │
           └────┬────┘
                ▼
910 ┌──────────────────────────────┐
    │     Determine curve type     │
    └──────────────┬───────────────┘
                   ▼
920 ┌──────────────────────────────────────────────┐
    │ Calculate k, l, m, and n lines from roots of │
    │         inflection point polynomial          │
    └──────────────────────┬───────────────────────┘
                           ▼
930 ┌──────────────────────────────────────┐
    │    Check and correct curve orientation │
    └──────────────────┬───────────────────┘
                       ▼
940 ┌──────────────────────────────────────┐
    │    Create texture coordinates from lines │
    └──────────────────┬───────────────────┘
                       ▼
                  ┌─────────┐
                  │   End   │
                  └─────────┘
```

Software 1280 Implementing Resolution
Independent Curve Rendering Techniques

RESOLUTION-INDEPENDENT CURVE RENDERING USING PROGRAMMABLE GRAPHICS HARDWARE

BACKGROUND

The evolution of graphics rendering technology has led to the development of procedural techniques for describing various steps in the rendering process. Procedural geometry is useful as a mechanism for producing arbitrarily complex geometry from compact descriptions. For a simple example, a cube object can be represented passively, as a polygonal representation comprising a list of eight vertexes and six sides. However, a more-compact, procedural representation can be developed where the cube becomes the result of a cube-generating procedure, which needs as input only position coordinates and a size. In another example, curves can be described according to Bézier control points, allowing a complex path to be mathematically described with only a few data points. Thus, geometric procedures often provide a useful, compact way to represent shapes, avoiding the access and transfer of many points of data. More complex procedures, such as rotations or splines, offer even greater compression of data. Other processes, such as shading and texture also take advantage of procedural techniques. Indeed, programmable procedural shaders are seen by some as a most efficient way to tackle graphical rendering problems.

However, conventional graphics display or graphics processor unit ("GPU") architectures enforce a divide between procedural geometry and procedural appearance (such as procedural shaders and texture) by means of a processing chain that operates on fixed, passive polygonal primitives. A common approach is to relegate procedural geometry to the pre-rasterization stages, to expand the procedures into polygons, and to devote a large amount of bandwidth to feeding polygons to the transformation and setup stages of the graphics processor.

These limitations can lead to visible and undesirable artifacts. One situation for which an optimal solution has not yet been found involves dealing with changes in resolution when zooming in on shapes. As an example, consider rendering a triangle, whose vertices are the control points of a quadratic Bézier curve, such that the parts inside and outside the curve are shaded differently, particularly when the triangle can be embedded in a three dimensional space and viewed in perspective.

One solution might be to densely sample the curve, forming many more smaller triangles and shading the inside and outside triangles accordingly. An alternative might be to create a texture image of the untransformed triangle and mark texture pixels, or texels, as either inside or outside, and then render the triangle with this texture. While both of these approaches will work, they both introduce sampling artifacts under zoom. When zooming in on the triangle using the sampled curve, a view will see the facets of the piecewise linear approximation to the curve. If a viewer instead zooms in on the textured triangle, he or she would see the texels of the underlying texture image grow as the texture resolution fails to keep up with the perspective under zoom.

SUMMARY

Techniques for rendering of procedurally-based curves allow for resolution-independent rendering of shapes defined by the curves. For example, each shape is broken into multiple triangles based on Bézier control points defining curves at its boundaries. Cubic curves are then identified by type through a standard procedure and this type is used to find a projecting of the curve onto a simple canonical form in a texture space. Once the curve is projected, a graphics processing unit can quickly interpolate points in the canonical texture space to identify points on either side of the curve, which allows the shape to be drawn efficiently. Because the procedural definition of the curves are kept intact, the curves can be drawn quickly at any resolution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

BRIEF DESCRIPTION OF THE DRAWINGS

FIG. 3 is an example of removing overlapping Bézier triangles.

FIG. 9 is a flowchart illustrating an example process for projecting a cubic curve onto canonical texture space.

DETAILED DESCRIPTION

The following description relates to the rendering of curves, in particular of cubic curves, though the creation of an implicit form for the curve which can be operated on by pixel shaders in a GPU architecture. Once an implicit curve is found for a given parametric Bézier curve, a GPU can render a solution by transforming this curve to screen space and evaluating the new implicit curve at pixel locations. Values less than zero can be considered "inside" the curve, while values greater than or equal to zero can by considered "outside" (by arbitrary choice).

Additional efficiencies are found by projecting the cubic curve to a canonical texture space, allowing simplified operations to take place in the pixel shaders. This is done because the screen space of a curve, and hence its implicit projection, can change at every frame. Recomputing an implicit form every time could be expensive without projecting to a canonical space. The projection is performed by identifying the type of the cubic curve and projecting the Bézier control points of the curve into texture coordinates which, when used along with a canonical curve of the same type, allows the simplified computation. When this projected data is passed to a GPU, pixel shaders are then able to determine, for interpolated points around the projected curve, which side of the curve each point is on.

Thus, for a shape defined in part by a cubic curve, the techniques described herein can efficiently determine for each point in screen space whether the point is inside or outside the curve. Because the curve is operated on in an implicit (albeit projected) form, the rendering techniques described herein can be performed efficiently at any level of resolution, avoiding the artifacts described above.

Benefits of the techniques described herein include resolution independence, compact geometric representation, and high performance. Resolution independence in this case means that the curved elements of a vector based image can be viewed as curved independent of viewpoint. The representation is compact because it consists of a collection of triangles that is proportional to the design time complexity of a vector image; this is often much smaller than a corresponding raster image of comparable quality. Finally, the techniques provide high performance since the shader programs described herein are small and run in parallel on programmable graphics hardware with multiple pixel pipelines.

1. GPU Architecture

Figure 1:
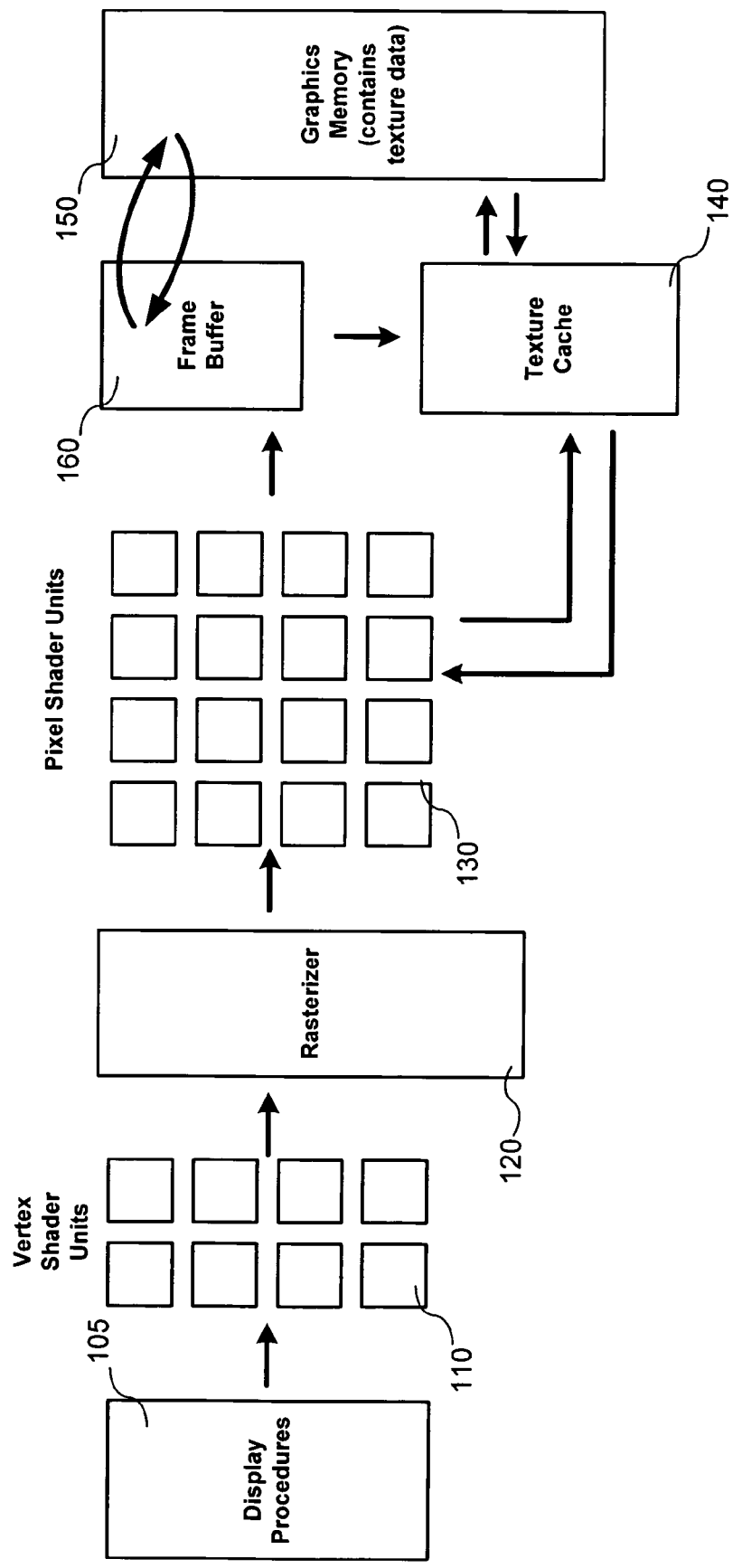
FIG. 1 is a block diagram of a graphics processing unit architecture.

The techniques described herein are implemented on a graphics processing unit. One example of a graphics processing unit is shown in FIG. 1, which illustrates a simplified overview of a traditional GPU architecture 100. In one implementation, the GPU architecture corresponds to the GPU 1215 illustrated in FIG. 12. Display data 105, which describes geometry of an image to be rendered, is input into vertex shader units 110, which generate polygonal representations of the geometric forms. These geometric forms are then input into a rasterizer, which interpolates the polygons and samples them to develop a sample set of points in image space, which can then be shaded and have texture added to them. These points are then passed to a series of programmable pixel shader units 130 which utilize parallel computing techniques to perform shading of the points, as well as adding and manipulating textures. It is this ability to perform parallel computations as well as to manipulate textures which makes the GPU, and the pixel shader units in particular, a useful platform for computation of shape. Pixel shader unit computation is frequently performed under the control of pixel shader programs, which are GPU-executable programs written to take advantage of the pixel shader units.

Textures, which can be pre-loaded into graphics memory 150 by a computer CPU before training, are cached in texture cache 140. In various implementations, textures can map directly to illustrated shapes, or can alternatively be used as canonical texture spaces, which are not necessarily directly tied to an image space. Once processing is complete, the image points can then be placed in a frame buffer 160 before being transferred to graphics memory 150.

2. Shapes Defined by Curves

Figure 2A:
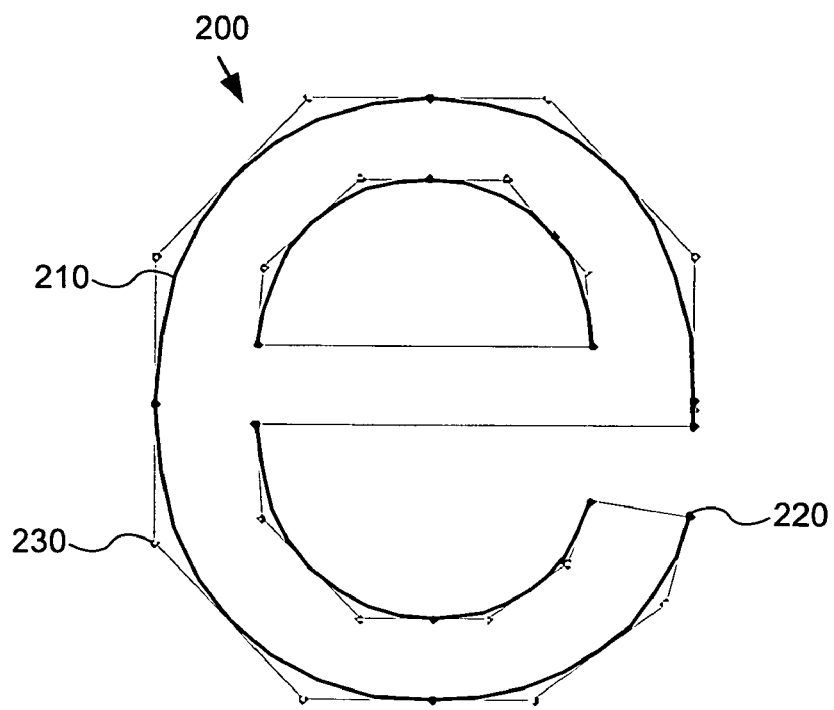
FIGS. 2a and 2b are examples of a Bézier-defined letter shape.
Figure 2B:
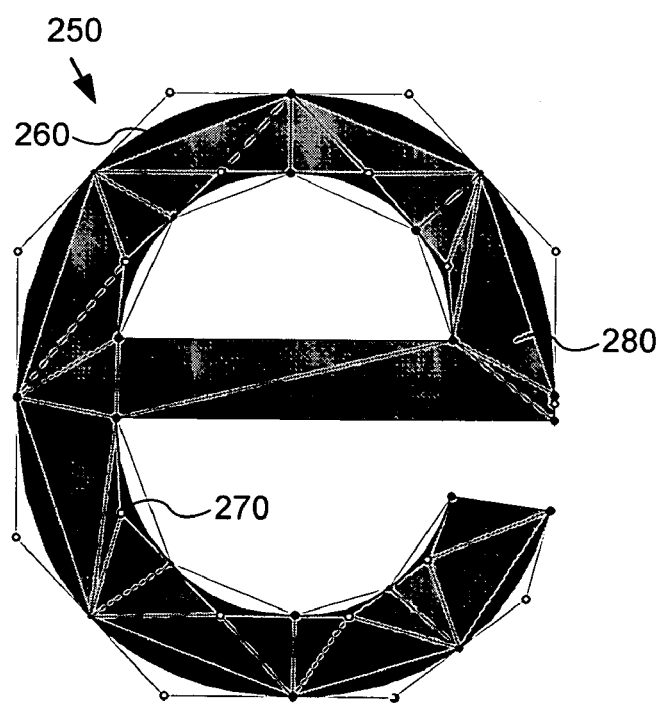

FIGS. 2a and 2b illustrate one example of a shape, in this case a TrueType™ font of the letter "e" defined by Bézier curves. FIG. 2a illustrates an outline of the letter 200. As FIG. 2a shows, the outline of the letter is defined by a series of curves, such as curve 210, which are connected to form the outline of the shape. Each of these curves is, in turn, defined by a set of Bézier control points. Some Bézier control points, such as control point 220, are found within the curve, some, such as control point 230, are found outside of the curve. As FIG. 2a illustrates, the outline 200 is composed of quadratic Bézier curves, each of which is defined by a set of three control points. In later sections, methods are described for rendering cubic curves, which are defined by four Bézier control points.

FIG. 2b illustrates a triangulation 250 of the control points illustrated in FIG. 2a. By doing such a triangulation, the shape of FIGS. 2a and 2b can be reduced to a mosaic of triangles, each containing quadratic curves, which can then be rendered triangle-by-triangle by the GPU. Note that the shades illustrated for different triangles in FIG. 2b are done for the purpose of illustrating different triangle types and do not necessarily represent a particular rendering of the illustrated shape.

FIG. 2b shows three examples Bézier curves in triangles, illustrating the determinations that must be made when rendering the shape. Triangle 260, found on the upper left of the shape, contains a curve whose concave side is on the inside of the shape; similar triangles can be found on the outside edge of the shape (and whose curves are shaded a medium gray). By contrast, triangle 270 contains a curve whose convex side is on the inside of the shape (and whose similar triangles contain curves which outline dark gray sections). In both instances, a section of the shape can be properly rendered by determining which side of the curve particular screen points are on, and coloring the screen point appropriately. Thus, points on the concave side of the curve in triangle 260, along with points on the convex side of the curve in triangle 270, can be colored the same, as in the case of a single-color font, or otherwise rendered as part of the same shape. Also illustrated is triangle 280, which is located entirely inside the shape. In one implementation, triangles such as this can be flagged so that computation of the triangle is avoided and the triangle is simply filled in. In another, the triangle may be projected into a single point in canonical texture space so that all points inside the triangle are rendered identically.

FIG. 3 illustrates a technique for creating non-overlapping triangles to outline a shape. FIG. 3 shows triangle overlap 300, where two separately-defined curves have points inside their triangles in common. If not addressed, such an overlap can possibly present visual artifacts. As triangles 350 illustrates, if an overlap is detected, it is a simple matter to subdivide the triangle with the larger area. This can be repeated until no more overlaps exist. This process will terminate provided the original boundary curves do not (self) intersect or osculate.

3. Types of Curves 3.1 Parametric Curves

The following descriptions take place in projective 2D space where points are represented by a homogeneous 3-tuple [x y w]; and the position of a point in the plane is [x/w y/w]. A "parametric curve" is a vector valued function of a single variable. Points on the curve are found by sampling the function at parameter values t. We write a rational parametric curve of degree n as the product $$C(t)=t \cdot C \qquad (3.1)$$

where the vector t contains power basis functions (as is known in the art) and C is a coefficient matrix that determines the shape of the curve. Thus, typically t takes the form:

$$t=[1\, t\, t^2 \ldots t^n], \qquad (3.2)$$

and C typically takes the form:

$$C = \begin{bmatrix} x_0 & y_0 & w_0 \\ x_1 & y_1 & w_1 \\ \vdots & \vdots & \vdots \\ x_n & y_n & w_n \end{bmatrix}. \quad (3.3)$$

A rational curve C(t) has components [x(t) y(t) w(t)]. In the special case where w(t)=1, C(t) is referred to as an integral curve. Commonly, the parameter t is restricted to the interval [0,1] and defines a curve segment.

Parametric curves may be represented in any linearly independent basis. It is well known that curves may also be represented in terms of the Bernstein (a.k.a Bézier) basis. This basis is multiplied by a vector of the Bézier control points to define the parametric curve. Changing from the power basis to the Bernstein basis is done through an invertible linear operation implemented as multiplication of the coefficient matrix by one of a set of well-known n×n basis-changing matrices. For quadratics and cubics respectively, these Matrices are referred to herein as $M_2$ and $M_3$.

3.2 Implicit Curves

An implicit curve is the zero set of a function of two variables $$c(x,y)=0 \quad (3.4)$$

That is, the set of points [x y] in the plane where c evaluates to zero. Implicit curves are useful in the techniques described herein because they allow a function which defines for a given point in image space whether the point is on the line. Additionally, if a point is not in the zero set of the equation, its sign is known to determine which side of the line the point is on. It is known (by Sederberg, 1983) that any curve which is defined parametrically by an equation:

$$x = \frac{x^n(t)}{w^n(t)}, \; y = \frac{y^n(t)}{w^n(t)} \quad (3.5)$$

will have an implicit equation of the form $$c^n(x,y)=0. \quad (3.6)$$

Combining these facts about parametric and implicit curves, the techniques described herein take advantage of the parametric nature of Bézier curves to create an implicit form. This implicit form, because it can be used to determine whether specific points are "inside" or "outside" a shape defined by the curve, can be used as an in/out test.

4. Projection of a Quadratic Curve

Figure 4:
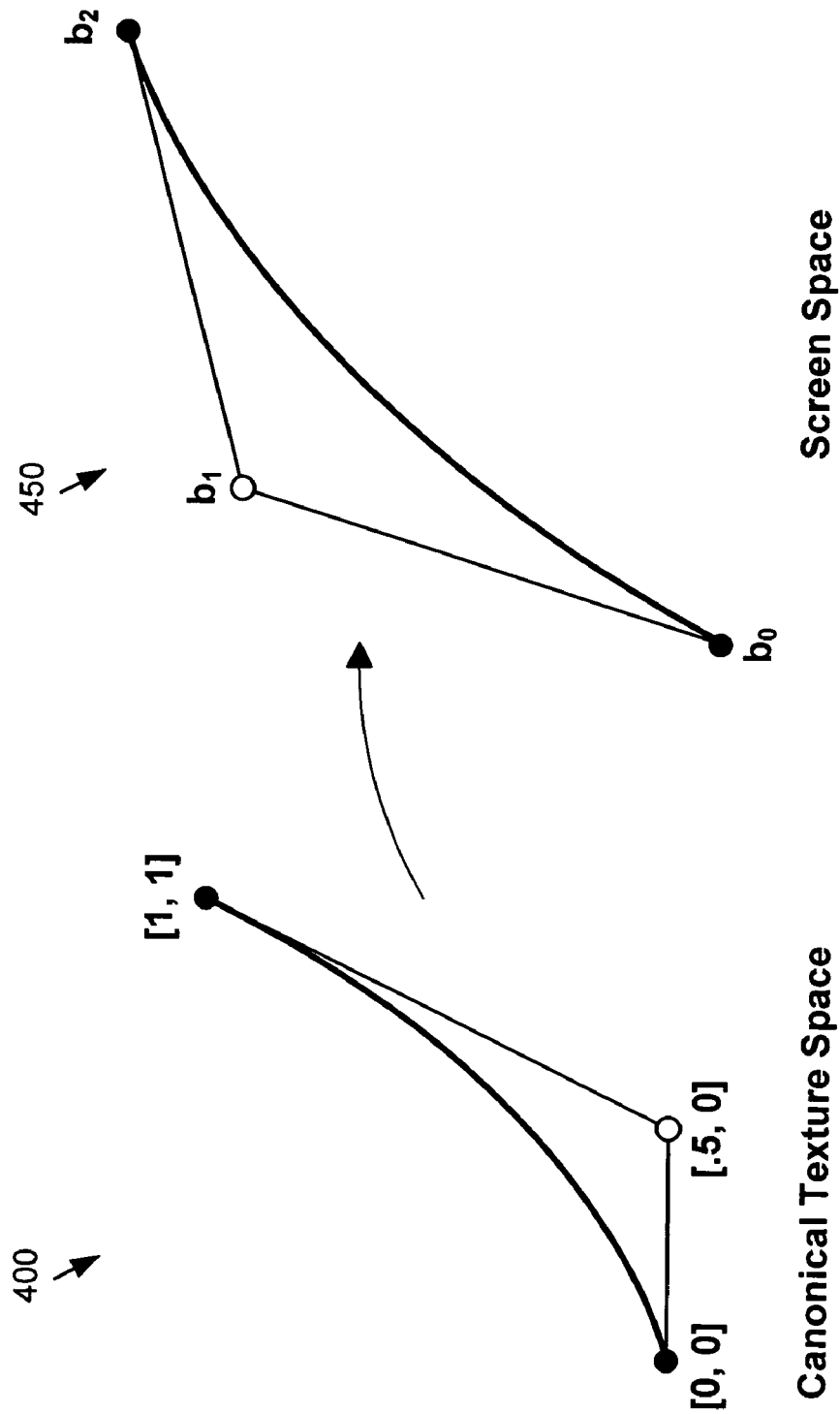
FIG. 4 is an example of a projection of a quadratic Bézier curve into canonical texture space.

FIG. 4 illustrates a simple example of projection of a triangle containing a Bézier curve 450 in screen space to a canonical curve 400 in canonical texture space. As FIG. 4 illustrates, the triangle defined by Bézier points $b_0$, $b_1$, and $b_2$ are projected into a canonical triangle in canonical texture space. In the illustrated example, the projected points of the canonical triangle are [0, 0], [.5, 0], and [1, 1] and the illustrated canonical curve can be the curve defined by:

$$f(u, v)=u^2-v. \quad (4.1)$$

Because the curve 450 is projected onto the curve 400, points relative to the inside or outside of the curve 450 will project onto similarly-oriented points in the projection. Thus, by projecting the curve on the screen 450 (which may have a complex implicit form) onto the relatively simple canonical curve defined by (4.1), the task of determining which side a given point lies can be performed by calculating the simple projection equation, saving processing resources.

In fact, it is known that any rational quadratic parametric curve can be projected onto the implicit curve (4.1). This means that for any quadratic curve, a point can be tested for being inside or outside the curve by being tested on this canonical curve (4.1), with the only possible differences between curves being the coordinates of their projection in the projected space. This makes rendering such a triangle using pixel shaders relatively easy; the image space triangle needs only be projected into a canonical texture space, and then equation (4.1) performed for points interpolated in the projection of the image space triangle.

5. Example Cubic Curves

Figure 5B:
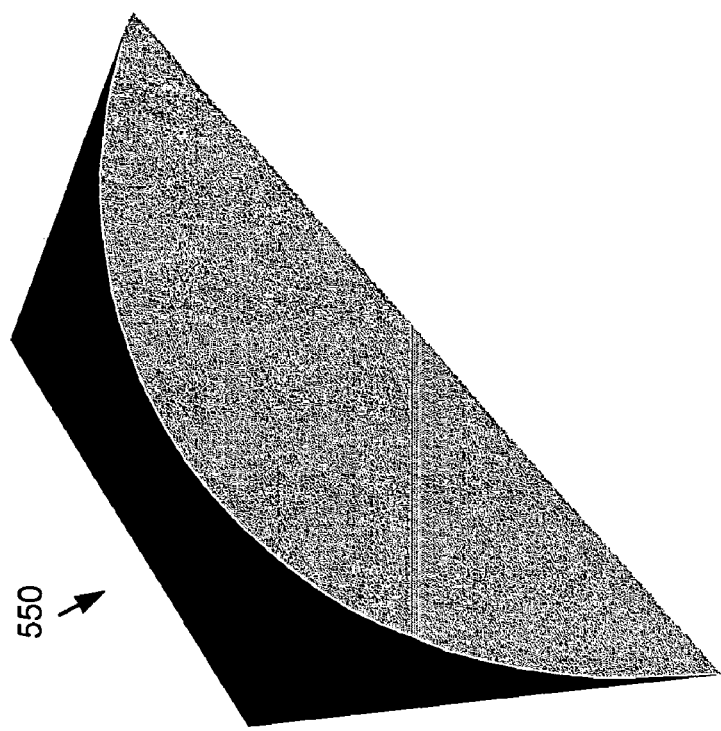
FIGS. 5a and 5b are examples of cubic curves.
Figure 5A:
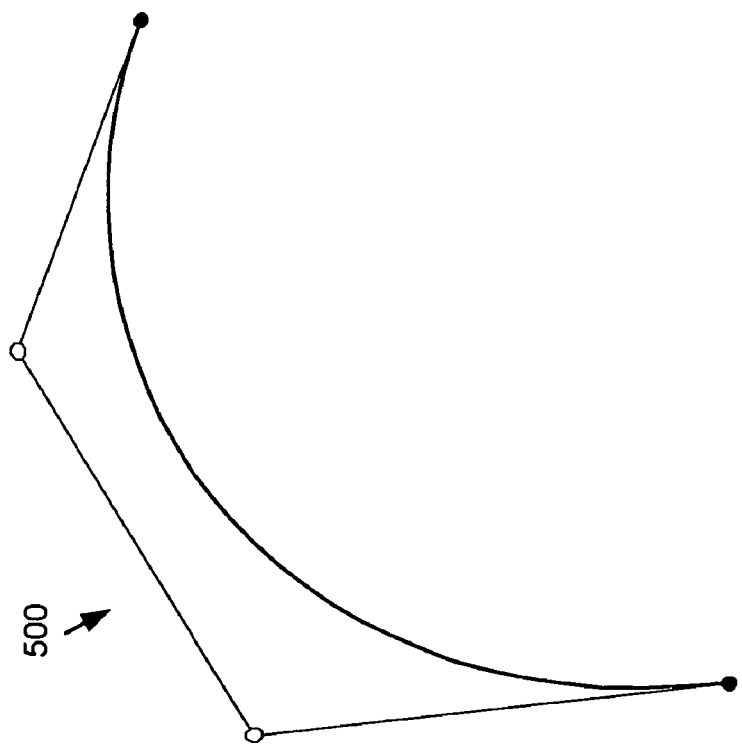

FIG. 5a illustrates an example 500 of a cubic curve, along with its Bézier control points. FIG. 5b illustrates an example 550 of such a curve defining a quadrilateral which is divided into two sections, much like the triangles illustrated above were defined by quadratic curves. Cubic curves also differentiate from quadratic curves because they are of a higher order; typically, cubic curves have degree 3 implicit and parametric forms, whereas quadratic curves have degree 2 forms.

Figure 6:
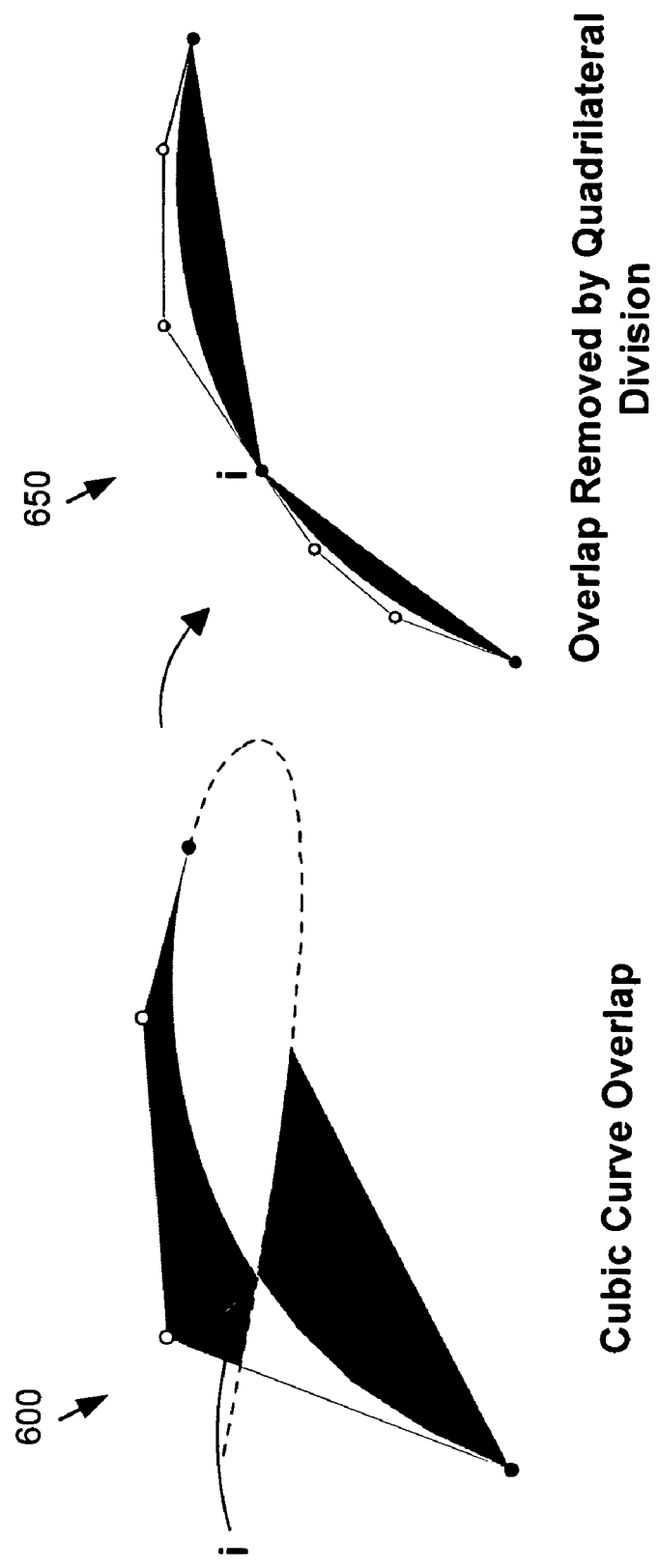
FIG. 6 is a set of examples of different cubic curve types.

Because cubic curves are inherently more complex (generally) than quadratic curves, they may exhibit different behavior, such as overlapping themselves or exhibiting a sharp cusp. FIG. 6 illustrates one such behavior, where a cubic curve has overlapped itself. This is undesirable because it can cause shading anomalies, by causing the "inside" and "outside" of a curve to fall at different points outside of the shape it is defining. Thus, in the example curve 600, the solid part of the curve would naturally be the part that defines the shape, and so the quadrilateral defined by the control points should be divided only into an upper and lower section. However, because the four Bézier control points define a cubic curve which overlaps itself at point i, a typical inside/outside test provides an aberrant shading of the sections. This is solved in curve 650 by dividing the curve at point i into two different curves, similarly to the division of FIG. 3. As FIG. 6 illustrates, cubic curves introduce complexities not found in quadratic curves.

Figure 7:
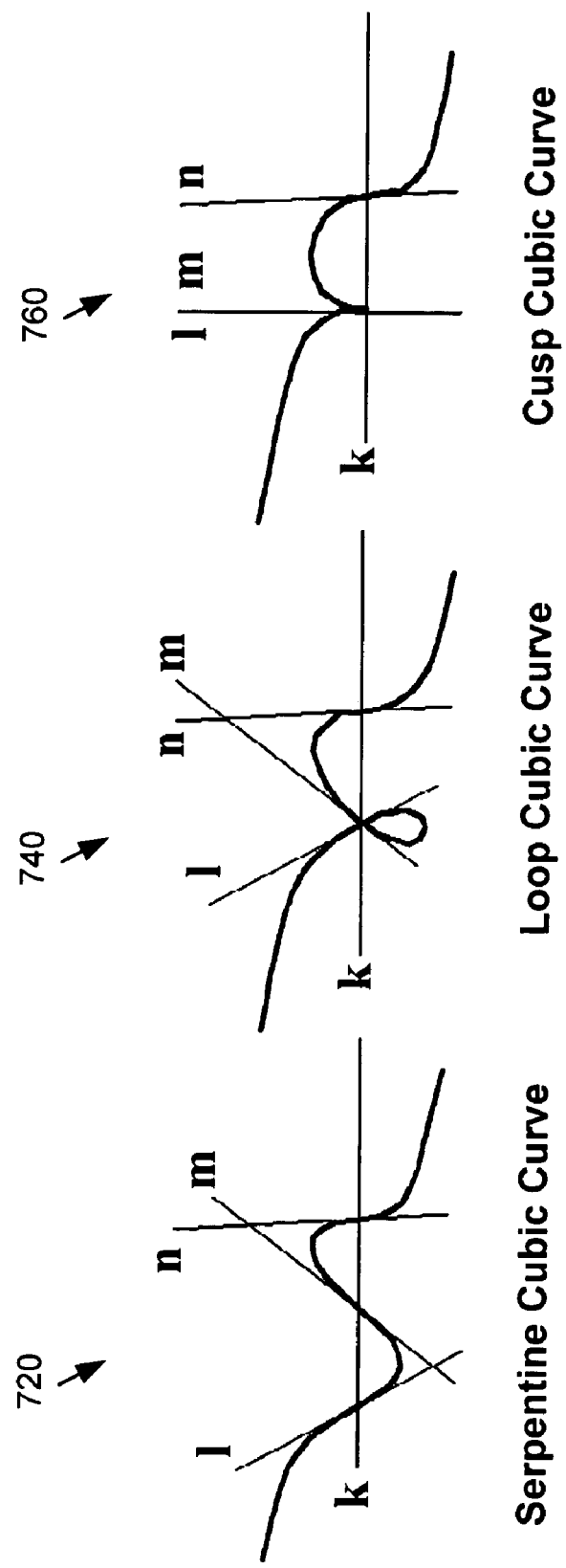
FIG. 7 is an example of avoiding overlap on a cubic curve.

FIG. 7 illustrates the known three different types of cubic curves, and illustrates that these types can be defined with reference to a set of lines k, l, m, and n. Curve 720 is a serpentine curve. This curve has three collinear inflection points (on line k) with tangent lines l, m, and n at those inflections. Curve 740 is a loop curve. This curve has one inflection and one double point with line k running through them. The lines l and m are the tangents to the curve at the double point and n is the tangent at the inflection. Curve 760 is a cusp curve. This curve has one inflection point and one cusp, with line k running through them. The lines l and m are identical here and are the tangent at the cusp; n is the tangent at the inflection. It should be noted that the names given to these curve types are used herein solely for the purpose of clarity and do not imply any limitations by themselves.

Salmon, in 1852, demonstrated that each type could be defined with the homogeneous algebraic implicit form $$c(x,y,w)=k^3-lmn. \quad (5.1)$$

Thus, for a given cubic curve, if a projection can be made to a canonical 4D texture space (for the four parameters defined by the four lines) then points near the curve can be identified as to which side they lie on by computing equation (5.1) for points interpolated from a set of texture coordinates created from the Bézier control points of the cubic curve.

6. Example Processes for Rendering Shapes

Figure 8:
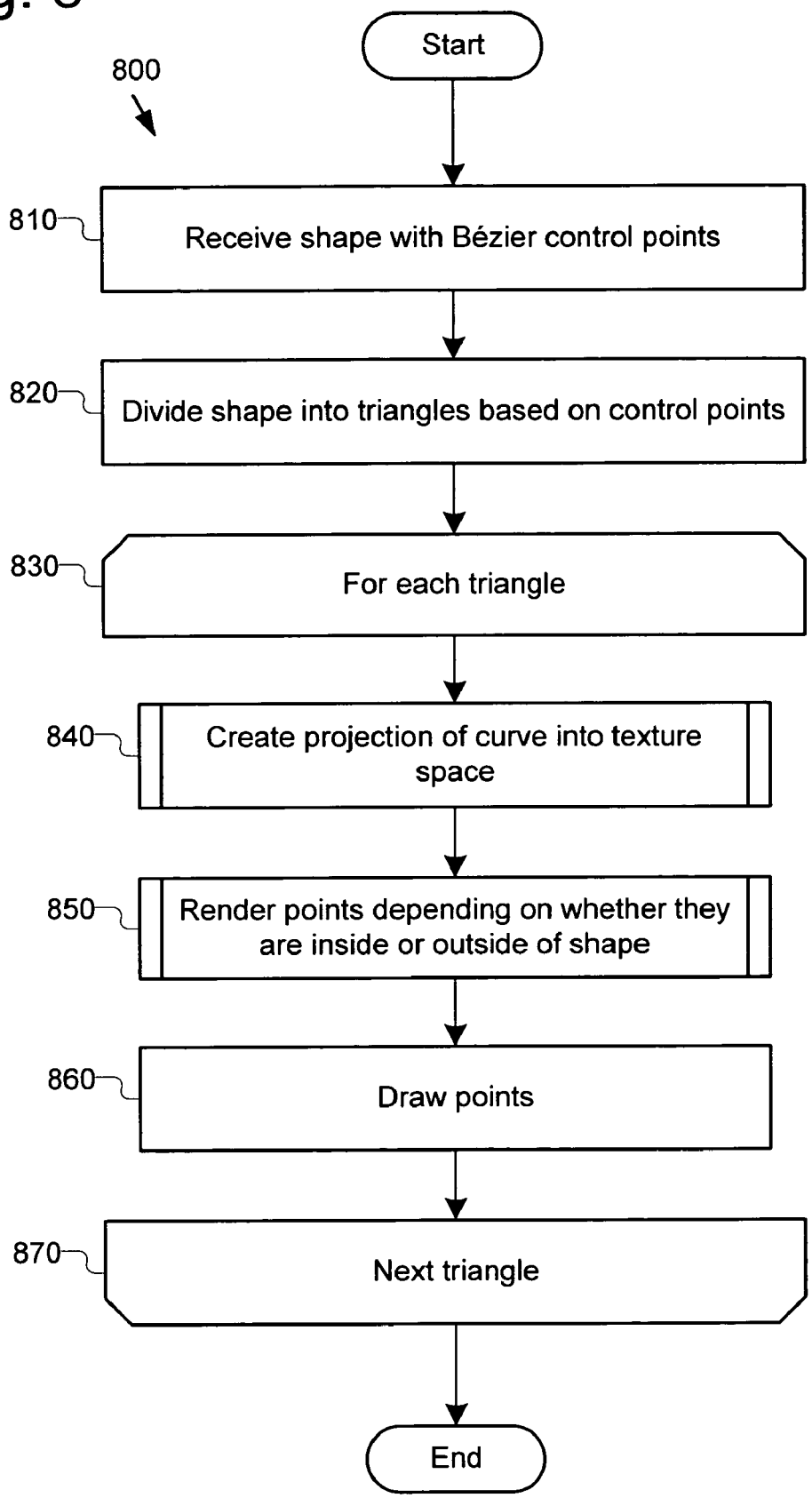
FIG. 8 is a flowchart illustrating an example process for rendering shapes with cubic curves.

FIG. 8 illustrates an example process 800 for rendering a shape including at least one cubic curve. In various implementations, blocks of process 800 may be combined, subdivided, or rearranged. In one implementation, the process 800 may be repeated for every frame a shape is rendered in. The process begins at block 810, where a shape with Bézier control points is received. Next, at block 820, the shape is divided into triangles based on its control points. In one implementation, this is performed by applying a constrained Delaunay triangulation to the control points, while requiring each curve edge and triangle containing a Bézier curve to be preserved in the triangulation. In another, the term "triangle" is used generically to refer to a polygonal shape defined by a set of Bézier control points for a curve. Hence, for a cubic curve, a "triangle" made from that curve may be a quadrilateral.

Next, at loop block 830, a subprocess is performed for each triangle. At block 840, a projection is made of the curve which defines the triangle into canonical texture space. One implementation of this process is defined in greater detail below with respect to FIG. 9. Next, at block 850, points are rendered depending on whether they are inside or outside of the shape, using the projected curve to make this determination. In one implementation, all processes before-block 850 are performed on a CPU, with the actual rendering of the shape performed on a GPU. Alternative implementations may divide work between the CPU and GPU in a different manner. One implementation of this process is defined in greater detail below with respect to FIG. 11. Then, at block 860, after the points have been rendered, the points are drawn. In one implementation, this comprises writing the rendered points to a buffer for drawing on a screen. In another implementation, block 860 may additionally comprise projection of the points on a screen, or printing or otherwise producing an image. Finally, the subprocess started at block 830 is repeated for any remaining triangles at block 870. In an alternative implementation, triangles which are wholly interior to a shape (such as triangle 280 of FIG. 2) are either rasterized traditionally or projected to texture coordinates which are entirely inside a shape.

FIG. 9 illustrates an example process 900, corresponding to block 840 of FIG. 8, for projecting a cubic curve into canonical texture space. In various implementations, blocks of process 900 may be combined, subdivided, or rearranged. The process starts at block 910, where the type of the cubic curve is determined. We shall go into this process in greater detail before returning to complete the process of FIG. 9.

Figure 10:
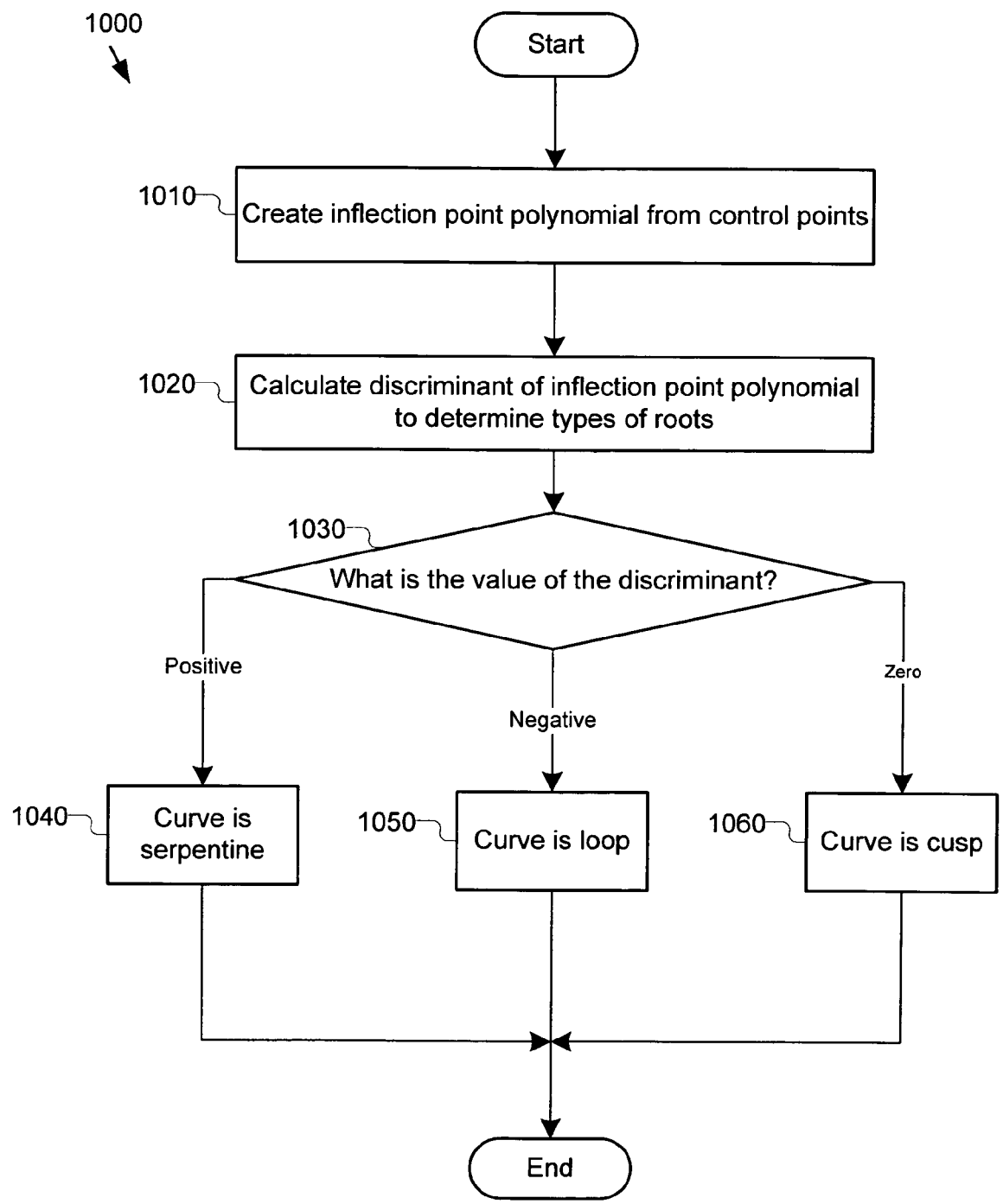
FIG. 10 is a flowchart illustrating an example process for determining a cubic curve's type.

FIG. 10 illustrates an example process 1000, corresponding to block 910 of FIG. 9, for determining the type for a cubic curve. In various implementations, blocks of process 1000 may be combined, subdivided, or rearranged. The process starts at block 1010, where an inflection point polynomial is created from the control points.

In one implementation, this polynomial can be found by a process described by Blinn in 2003. The inflection point polynomial is a polynomial created to contain zeros at each inflection point of the cubic curve. This is done by converting the Bézier control points $b_0, \ldots, b_3$ to a power basis by taking:

$$C = \begin{bmatrix} x_0 & y_0 & w_0 \\ x_1 & y_1 & w_1 \\ x_2 & y_2 & w_2 \\ x_3 & y_3 & w_3 \end{bmatrix} = M_3 \cdot B. \tag{6.1}$$

From C, a vector $d = [d_0\ d_1\ d_2\ d_3]$ is created, with the following definitions for the elements of d:

$$d_0 = \det \begin{bmatrix} x_3 & y_3 & w_3 \\ x_2 & y_2 & w_2 \\ x_1 & y_1 & w_1 \end{bmatrix} \tag{6.2}$$

$$d_1 = -\det \begin{bmatrix} x_3 & y_3 & w_3 \\ x_2 & y_2 & w_2 \\ x_0 & y_0 & w_0 \end{bmatrix} \tag{6.3}$$

$$d_2 = \det \begin{bmatrix} x_3 & y_3 & w_3 \\ x_1 & y_1 & w_1 \\ x_0 & y_0 & w_0 \end{bmatrix} \tag{6.4}$$

$$d_3 = -\det \begin{bmatrix} x_2 & y_2 & w_2 \\ x_1 & y_1 & w_1 \\ x_0 & y_0 & w_0 \end{bmatrix} \tag{6.5}$$

As defined here, it can be seen that d is (up to a scalar multiple) the unique vector perpendicular to the columns of the coefficient matrix C. Thus, d will not be changed by a projective transform of the curve it is based upon, since $$d \cdot (C \cdot P) = (d \cdot C) \cdot P = [000] \tag{6.6}$$

for a projective transform P.

Given the vector d then, the inflection point polynomial can be found by $$I(t,s) = d_0 t^3 - 3 d_1 t^2 s + 3 d_2 t s^2 - d_3 s^3. \tag{6.7}$$

Note that equation (6.7) is understood to be given in terms of a homogenous parameter pair (t, s), in order that values at infinity may be represented.

Next, at block 1020, the types of roots of the (6.7) are determined by calculating the discriminant of the (6.7). This can be performed by the following calculations:

$$\delta_1 = d_0 d_2 - d_1^2, \tag{6.8}$$

$$\delta_2 = d_1 d_2 - d_0 d_3, \tag{6.9}$$

$$\delta_3 = d_1 d_3 - d_2^2, \tag{6.10}$$

$$\mathrm{discr}(I(t,s)) = 4\delta_1 \delta_3 - \delta_2^2. \tag{6.11}$$

Next, at decision block 1030, the type of the cubic curve is determined according to the value of the discriminant. If the value is positive, the curve has three distinct roots and is determined to be serpentine at block 1040. If the value is negative, the curve has one real root and two complex roots and is determined to be loop at block 1050. And if the value is zero, the curve has one double root and a distinct single root and is determined to be cusp at block 1060. Two additional possibilities are not illustrated. The first is if $\delta_1 = \delta_2 \delta_3 = 0$, in which case there is one triple root, which means the curve is actually a degenerate case of being a quadratic curve. The second is if $d_0 = d_1 = d_2 = d_3 = 0$, which means the inflection point polynomial is identical to 0, and the curve is a line or a point. These degenerate cases have known solutions and will not be illustrated further.

Returning to FIG. 9, at block 920 the lines k, l, m, and n are calculated by manipulating the roots of the inflection point polynomial. We will avoid lengthy derivations (which are within the knowledge of one of skill in the art) of how to obtain the roots of the inflection point polynomial for each type of cubic curve.

Thus, if a given cubic curve C(t, s) has been classified according to the method just given, we assume that the three roots $(t_l,s_l)$, $(t_m,s_m)$, and $(t_n,s_n)$ of the cubic inflection point polynomial I(t,s) have been determined. If the curve is a loop, we assume that the parameter values $(t_d,S_d)$ and $(t_e,s_e)$ of the double point have been found as the roots of the quadratic polynomial found by computing the Hessian of I(t,s). In the case of a cusp, the double point parameters coincide at the parameter value $(t_d,S_d)=(t_e,S_e)$.

Block 920 results in finding cubic polynomials k(t,s), l(t,s), m(t,s), and n(t,s) that represent the values of the four linear functionals k, l, m, n evaluated at points on the curve C(t,s). For example k(t,s)=C(t,s)·k. These polynomials are constructed differently for each of the three cubic curve types by considering how C(t,s) behaves as it passes through the intersection points of line k with lines l, m, and n. These points are all zeroes of k(t,s), l(t,s), m(t,s), and n(t,s), so the polynomials can be constructed as products of known linear factors, according to the following labels:

$$L=(st_l-ts_l) \quad (6.12)$$

$$M=(st_m-ts_m) \quad (6.13)$$

$$N=(st_n-ts_n) \quad (6.14)$$

$$D=(st_d-ts_d) \quad (6.15)$$

$$E=(st_e-ts_e) \quad (6.16)$$

Given these labels, the following table provides factored forms for each of k(t,s), l(t,s), m(t,s), and n(t,s):

|        | serpentine | loop   | cusp   |
|--------|------------|--------|--------|
| k(t, s) | LMN       | DEN    | $D^2N$ |
| l(t, s) | $L^3$     | $D^2E$ | $D^3$  |
| m(t, s) | $M^3$     | $DE^2$ | $D^3$  |
| n(t, s) | $N^3$     | $N^3$  | $N^3$  |

(6.17)

Note that, for each curve type above, the relation $k^3-lmn=0$ is satisfied.

Before creating 4D texture coordinates, however, the curve orientation must be checked at block 930 to ensure that the proper side is considered the "inside" of the curve. In one implementation, this is done by taking the convention that the inside of the curve is to the right of the direction of parametric travel as increases. This can be done by comparing a tangent line formula calculated for the parametric form of the cubic curve with a tangent line calculated from the gradient of the implicit form and evaluating both at one point. Because the two tangent lines will be equivalent up to a scale factor, the orientation can be based on the sign of that scale factor. Thus, by convention, in one implementation, if the scale factor is positive, the signs of k and l are flipped to "re-orient" the curve.

Finally, at block 940, the 4D texture coordinates are created. These are to be assigned to the Bézier control points corresponding to the Bézier coefficients of k(t,s), l(t,s), m(t,s), and n(t,s). The Bézier coefficients are found by expanding the factored forms of these polynomials, and collecting power basis coefficients into a 4×4 matrix F, then taking the product $M_3^{-1}F$. The resulting coefficients after the Bézier basis is taken out will be the texture coefficients. At this point, the cubic curve has been projected into canonical texture space.

Figure 11:
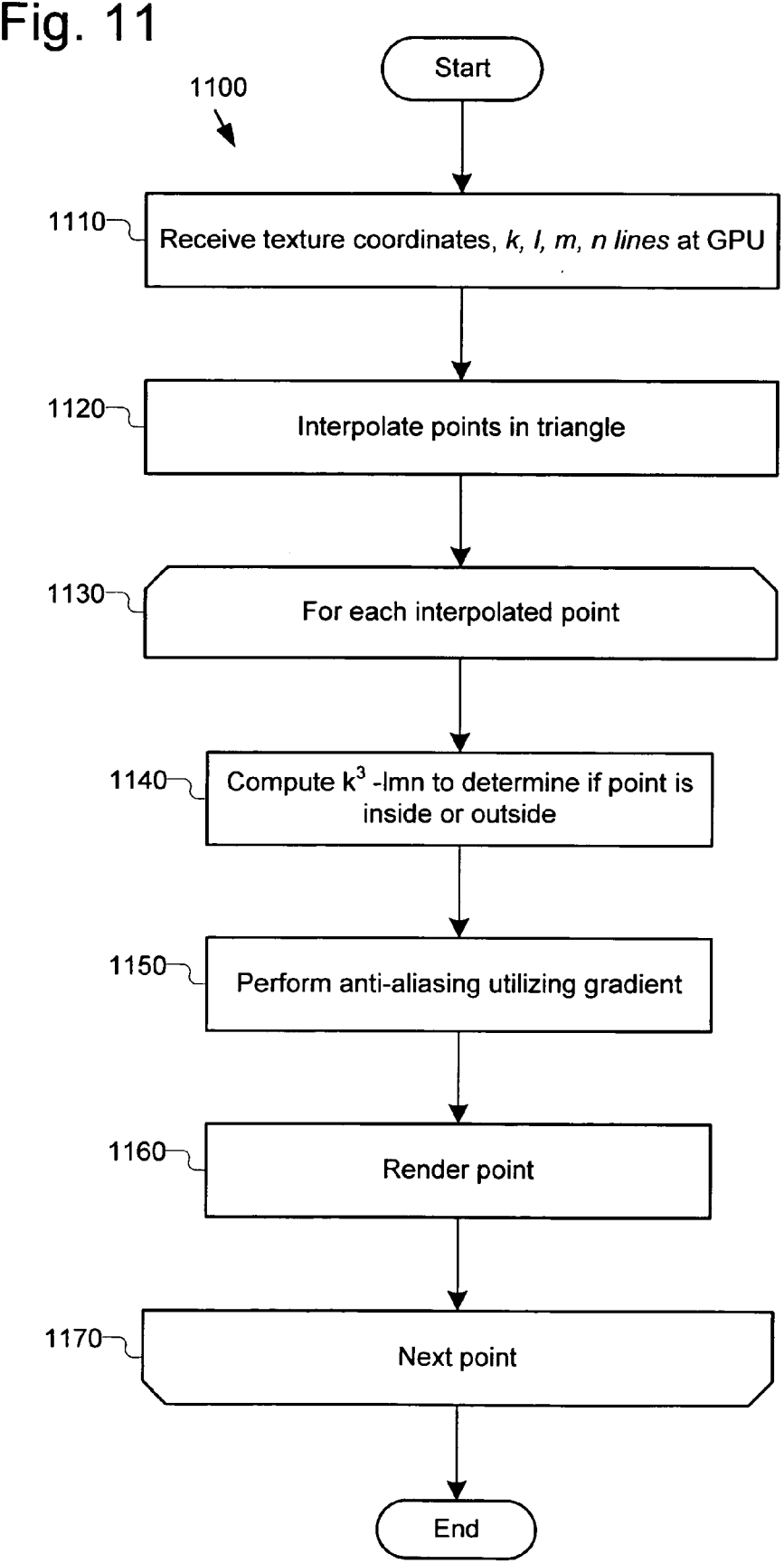
FIG. 11 is a flowchart illustrating an example process for determining if points are inside or outside a shape.

FIG. 11 illustrates an example process 1100, corresponding to block 850 of FIG. 8, for rendering points based on projections into canonical space. In various implementations, blocks of process 1100 may be combined, subdivided, or rearranged. In one implementation, process 1100 is performed by a GPU, while the projection processes discussed above are performed on a CPU. The process begins at block 1110, where texture coordinates for the lines k, l, m, and n are received by the GPU. Next, at block 1120, points are interpolated for the projected triangle. Then at block 1130, a subprocess begins for each interpolated point. At block 1140, the value of $k^3-lmn$, the canonical cubic curve form is calculated on the pixel shaders of the GPU. Based on the sign of this value, it is determined whether the point is inside or outside the curve.

Next, at block 1150, anti-aliasing is performed for the point to reduce aliasing artifacts brought on by sampling at pixel centers, which is discussed in the next section. Finally, at block 1160 the point is rendered by the GPU and the subprocess repeats for any remaining points at block 1170.

7. Example Anti-Aliasing Techniques

It is known that if the distance to a pixel to the curve is known, that a filtered alpha value for the pixel can be estimated by either a 1D texture lookup or by evaluating a simple blending function.

In the following example implementation, this distance is evaluated with reference to pixel space [X Y] rather than the image space previously relied upon. This can be determined by noting that the gradient of the curve is perpendicular to the curve, and thus calculation of the gradient function at nearby points produce vectors that are nearly perpendicular. Thus, an approximate signed distance function can be given by $$d(X,Y) = \frac{g(X,Y)}{\|\nabla g(X,Y)\|}. \quad (7.1)$$

While g(X,Y) can be found through composition of the curve with the mapping from screen space to texture space. This second mapping can be found as composition of a mapping of curve design space to texture space with an inverse of viewing transform V described below in Section 8. We do not belabor the derivation of this composition here in the interest of brevity.

While the signed distance function can be used to determine a filtered color value when a pixel is close to a curve boundary, pixels that need to be affected by anti-aliasing calculations often belong to interior triangles that do not contain curves, or may be outside the boundary of the shape. In order to affect pixels whose centers lie outside the shape boundary, it is useful to add geometry to cover these pixels. One approach is to include some of the negative space of a shape by enclosing it in a slightly enlarged bounding box and triangulating. This will create triangles that will (in general) cover pixel centers that are adjacent to line segments or points of tangency on the curves. It is still possible that for highly oblique viewpoints some pixel centers may be missed, however this is unlikely to cause a large problem. Testing with a bounding box enlargement of 10% has not shown this to be a problem.

The other difficulty relating to preparing geometry for anti-aliasing is handling triangles that do not contain curves. For triangles that have one edge on a boundary, the techniques can assign texture coordinates so that the edge will be treated as an implicit line. For triangles with two edges on a boundary, the techniques can assign texture coordinates to treat the shape as a pair of intersecting lines. If a triangle has all three edges on the boundary, a quadratic cannot be found that will interpolate this data. In such cases the techniques can subdivide the triangle to isolate the boundaries.

In implementation takes a somewhat brute force approach by subdividing all interior triangles to compute a variant of the chordal axis of a shape, as described by Prasad in 1997. The chordal axis is similar to the medial axis, and easily computed from the triangulation. By subdividing triangles along the chordal axis, each new triangle will have at most two vertices incident on a boundary, greatly simplifying texture coordinate assignment for producing a signed distance function.

8. Examples of Degenerate Transforms

Careful treatment of extreme viewpoints, such as when a planar image is viewed (nearly) edge-on, can greatly enhance overall image quality. Given V, the 3×3 matrix that represents the transform from curve design space to screen space, a triangle will degenerate when det(V)=0. This means that the triangle is being viewed edge on, which can lead to visible artifacts.

However det(V) cannot be monitored because V is scale invariant. In order to create a metric with meaningful units that signify when a triangle is approaching an edge state, the line-at-infinity in the curve design plane z=0 is mapped to the screen space line h. When a triangle is viewed edge-on, it will coincide with this line. This allows us to receive, or any pixel, the pixel's distance (in pixels) to the line-at-infinity. In one implementation, this technique choose an arbitrary tolerance of 50 pixels to the line h and smoothly reduce opacity in this region.

This results having planar images which can be freely transformed with no pixelation artifacts. As the plane containing the image approaches being viewed edge on, it will fade out and fade in as the plane is rotated. In one implementation the computing cost of this effect is a dot product in the vertex shader, and an extra field of vertex data that needs to be interpolated by the rasterizer, and the computation or lookup of, and multiplication by, the fade coefficient.

9. Implementation Examples

In one implementation, the techniques described herein are performed in two distinct phases. In the first phase, constituent curve segments are analyzed, looking for overlap and doubling points and subdividing as necessary. Then texture coordinates for subsequent shader evaluation are assigned and the plane is triangulated together with the Bézier control points of the curves. This can all be done as a preprocess on the CPU. In the second phase, the triangles are transferred to GPU memory and rendered using the programmable pipeline. Once resident in GPU memory, the CPU is free to do other work and need only issue new transformation matrices for each new frame.

What follows is one example implementation, in Microsoft DirectX high-level shader language, of a cubic shader working on integral (non-rational) cubic curves. Anti-aliasing instructions are omitted for simplicity. Additionally, the cubic shader example given herein is able to take advantage of a simplified version of equation (5.1). Because the implementation works with integral cubic curves, the value w is assumed to be equal to 1. Additionally, it can be assumed that the interpolated value of n is equal to 1. Thus, equation (5.1) simplifies to $$c(x,y)=k^3-lm, \quad (9.1)$$

giving the following implementation:

```
float4x4 WVP : WORLDVIEWPROJECTION;
float4 VertexShader (
    float3 pos : POSITION,
    inout float3 klm : TEXCOORD0 ) : POSITION
{
    return mul(float4(pos, 1), WVP);
}
float4 PixelShader(float3 klm : TEXCOORD0) : COLOR
{
    clip(pow(klm.x,3) - klm.y*klm.z);
    return (float4)0;
}
```

A final alternative implementation is to utilize the curve-rendering techniques described herein to render curves as paths instead of as describing filled regions. The above-described signed distance function can be used to determine a pixel's distance to a curve, which allows a Bézier curve to be described with varying thickness. In one implementation, this is particularly useful when zooming in on a line that needs to maintain a particular screen thickness despite the zoom. In another, arbitrary thicknesses are possible.

10. Computing Environment

The above described curve-rendering techniques can be performed on any of a variety of devices in which digital media signal processing is performed, including among other examples, computers; image and video recording, transmission and receiving equipment; portable video players; video conferencing; and etc. The techniques can be implemented in hardware circuitry, as well as in digital media processing software executing within a computer or other computing environment, such as shown in FIG. 12.

Figure 12:
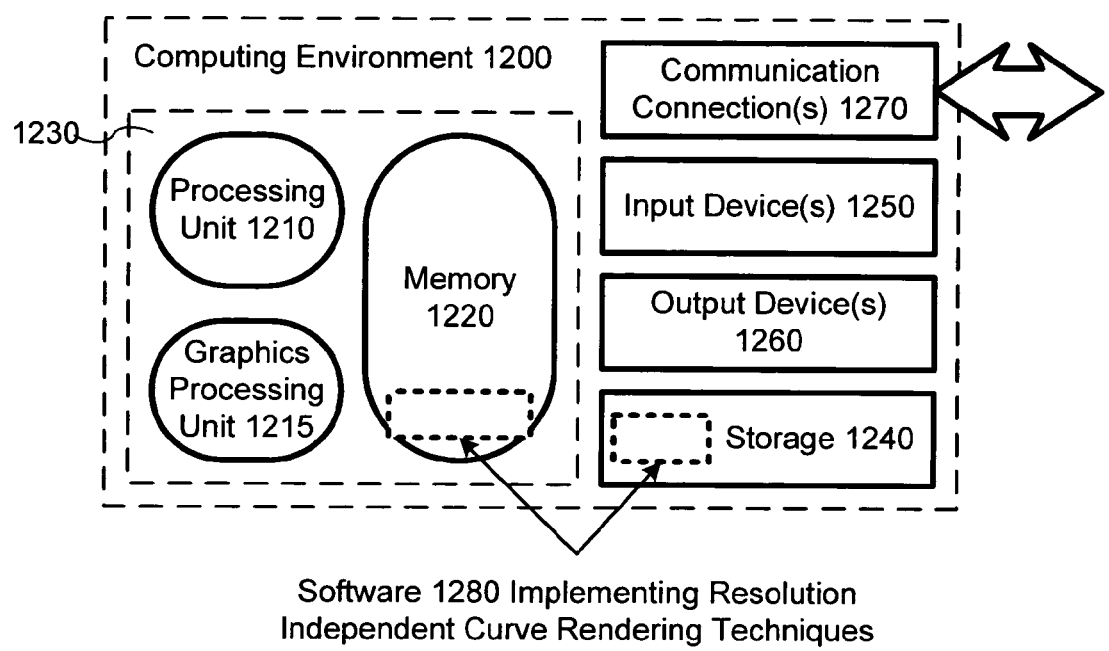
FIG. 12 is a block diagram of a suitable computing environment for implementing the rendering techniques of FIG. 8.

FIG. 12 illustrates a generalized example of a suitable computing environment (1200) in which described embodiments may be implemented. The computing environment (1200) is not intended to suggest any limitation as to scope of use or functionality of the invention, as the present invention may be implemented in diverse general-purpose or special-purpose computing environments.

With reference to FIG. 12, the computing environment (1200) includes at least one processing unit (1210), a GPU (1215), and memory (1220). In FIG. 12, this most basic configuration (1230) is included within a dashed line. The processing unit (1210) executes computer-executable instructions and may be a real or a virtual processor. In a multi-processing system, multiple processing units execute computer-executable instructions to increase processing power. The memory (1220) may be volatile memory (e.g., registers, cache, RAM), non-volatile memory (e.g., ROM, EEPROM, flash memory, etc.), or some combination of the two. The memory (1220) stores software 1280) implementing the described encoder/decoder and efficient transform coefficient encoding/decoding techniques. The GPU (1215) may be integrated with the processing unit 1210 on a single board or may be contained separately. In one implementation, the GPU (1215) has architecture as illustrated in FIG. 1.

A computing environment may have additional features. For example, the computing environment (1200) includes storage (1240), one or more input devices (1250), one or more output devices (1260), and one or more communication connections (1270). An interconnection mechanism (not shown) such as a bus, controller, or network interconnects the components of the computing environment (1200). Typically, operating system software (not shown) provides an operating environment for other software executing in the computing environment (1200), and coordinates activities of the components of the computing environment (1200).

The storage (1240) may be removable or non-removable, and includes magnetic disks, magnetic tapes or cassettes, CD-ROMs, CD-RWs, DVDs, or any other medium which can be used to store information and which can be accessed within the computing environment (1200). The storage (1240) stores instructions for the software (1280) implementing the described curve-rendering techniques.

The input device(s) (1250) may be a touch input device such as a keyboard, mouse, pen, or trackball, a voice input device, a scanning device, or another device that provides input to the computing environment (1200). For audio, the input device(s) (1250) may be a sound card or similar device that accepts audio input in analog or digital form, or a CD-ROM reader that provides audio samples to the computing environment. The output device(s) (1260) may be a display, printer, speaker, CD-writer, or another device that provides output from the computing environment (1200).

The communication connection(s) (1270) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The curve-rendering techniques herein can be described in the general context of computer-readable media. Computer-readable media are any available media that can be accessed within a computing environment. By way of example, and not limitation, with the computing environment (1200), computer-readable media include memory (1220), storage (1240), communication media, and combinations of any of the above.

The curve-rendering techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "interpolate," and "compute" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

We claim:

1. A method of rendering a shape defined at least in part by a cubic curve on a computer comprising a display device, the method comprising:

identifying Bezier control points for the cubic curve, the Bezier control points defining a polygon around the cubic curve;

creating a projection of the cubic curve and the polygon into a texture space;

for each of a plurality of pixels inside the polygon, determining on which side of the curve the pixel lies in the polygon based on the projection of the pixel into the texture space; and rendering the shape in an image by, for each of the plurality of pixels, choosing a color at least in part according to which side of the curve the pixel lies on in the polygon and rendering the pixel in the chosen color;, and displaying the image on the display device.

2. The method of claim 1, wherein creating a projection of the cubic curve comprises:

identifying the cubic curve as having a type matching one of three canonical curves; and projecting the cubic curve onto the one of the three canonical curves which has the identified type.

3. The method of claim 2, wherein identifying the cubic curve comprises identifying a set of lines which define the curve.

4. The method of claim 3, wherein projecting the cubic curve further comprises creating a set of coordinates in the texture space based on the set of lines.

5. The method of claim 3, wherein identifying the cubic curve comprises:

creating an inflection point polynomial for the cubic curve;
determining roots of the inflection point polynomial; and
analyzing the roots to determine what type of curve the cubic curve is.

6. The method of claim 5, wherein identifying the set of lines comprises generating the set of lines by multiplying linear factors containing the roots of the inflection point polynomial.

7. The method of claim 6, wherein creating a projection of the curve into texture space further comprises creating a set of texture coordinates.

8. The method of claim 7, wherein the texture coordinates correspond to Bezier coordinates of the set of lines.

9. The method of claim 8, further comprising:

identifying one side of the cubic curve as inside by comparing a tangent line formula calculated from a parametric form of the cubic curve with a tangent line formula calculated from a gradient of an implicit form of the cubic curve; and switching signs of two of the lines in the set of lines before creating a set of texture coordinates, thereby re-orienting the curve in texture space.

10. The method of claim 1, wherein the cubic curve is projected onto the curve $c(x, y, w) = k^3 - lmn$.

11. The method of claim 1, further comprising applying anti-aliasing to some of the plurality of pixels, the anti-aliasing based at least in part on an approximate signed distance function from each of the plurality of pixels to the curve, the function based at least in part on a gradient at each of the plurality of points.

12. The method of claim 11, wherein at least some of the plurality of points to which anti-aliasing is applied are found in triangles created by triangulating negative space around the shape.

13. A method of displaying a point on a computer comprising a display device by determining the location of the point relative to a cubic curve, the point lying within a polygon defined by Bezier control points for the cubic curve, the method comprising:

determining a set of lines which define the curve;

mapping the lines into 4D texture coordinates;

mapping the point to a texture point in 4D texture space;

determining an indication of how close the point is to the curve and on which side of the curve the point lies within the polygon by comparing the texture point to a known implicit curve in the texture space; and rendering the point in an image by choosing a color for the point according to the indication of how close the point is to the curve and on which side of the curve the point lies within the polygon and rendering the point in the chosen color, and displaying the image on the display device.

14. The method of claim 13, wherein determining the set of lines comprises identifying a type of cubic curve to which the cubic curve belongs.

15. The method of claim 14, wherein identifying the type of cubic curve comprises counting the number and type of roots contained in a set of roots of an inflection point polynomial created from the cubic curve.

16. The method of claim 15, wherein determining a set of lines further comprises creating cubic linear functionals from linear factors containing roots from the set of roots.

17. The method of claim 13, further comprising rendering a path described by the cubic curve by repeating the method to display points which are close to the curve.

18. One or more computer-readable storage media containing instructions, which, when executed on a computer comprising a display device, cause the computer to perform a method for rendering a shape defined at least in part by a cubic curve, the method comprising:

determining a set of Bezier control points describing the shape;

tessellating the shape into one or more triangles defined by the Bezier control points, including a triangle defined by the Bezier points defining the cubic curve;

projecting the cubic curve into a canonical curve in a 4D texture space;

projecting each of a plurality of points in the triangle defined by the Bezier points defining the cubic curve into the 4D texture space, whereby the projected plurality of points constitutes an interpolated projection of the triangle defined by the Bezier points;

for each of the plurality of points, determining whether each of the plurality of points is in the shape or not by determining on which side of the canonical curve a projection of each of the plurality of points falls within the projection of the triangle; and rendering the shape in an image by, for each of the plurality of pixels, choosing a color at least in part according to on which side of the canonical curve the projection of the pixel lies within the projection of the triangle and rendering the pixel in the chosen color; and displaying the image on the display device.

19. The computer-readable storage media of claim 18, wherein projecting the cubic curve comprises:

determining if the curve is of a type that is a serpentine, loop, or cusp cubic curve;

determining, based on the determined type, four linear functionals which define the curve;

generating four texture coordinates from the four linear functionals which define boundaries in texture space for a triangle containing a canonical curve of the determined type.

20. The computer-readable storage media of claim 19, wherein determining four linear functionals comprises multiplying linear factors containing roots found for a inflection point polynomial generated from the cubic curve.

* * * * *